(12) United States Patent
Sper

(10) Patent No.: US 7,305,327 B2
(45) Date of Patent: Dec. 4, 2007

(54) WIRELESS METER FOR REAL TIME MEASUREMENTS AND METHOD THEREFOR

(75) Inventor: Devin Sper, Scottsdale, AZ (US)

(73) Assignee: Sper Scientific Ltd, Scottsdale, AZ (US)

( * ) Notice: Subject to any disclaimer, the term of this patent is extended or adjusted under 35 U.S.C. 154(b) by 0 days.

(21) Appl. No.: 11/343,133

(22) Filed: Jan. 30, 2006

(65) Prior Publication Data

US 2007/0179754 A1    Aug. 2, 2007

(51) Int. Cl.
    *G06F 17/40*     (2006.01)
    *G06F 19/00*     (2006.01)

(52) U.S. Cl. ............... 702/187; 340/500; 340/531; 340/539.1; 340/539.11; 340/539.22; 340/539.26; 340/601; 340/870.01; 340/870.28; 702/1; 702/127; 702/188; 702/189; 702/198

(58) Field of Classification Search ............... 340/500, 340/531, 539.1, 539.16, 539.17, 539.19, 340/854.3, 854.6, 854.7, 870.01, 870.28, 340/539.11, 539.22, 539.26, 601; 702/1, 702/57, 60, 61, 62, 64, 104, 127, 187, 189, 702/198, 188

See application file for complete search history.

(56) References Cited

U.S. PATENT DOCUMENTS

| | | | | |
|---|---|---|---|---|
| 3,197,702 A | * | 7/1965 | Schweitzer, Jr. | ............. 324/127 |
| 3,230,454 A | * | 1/1966 | Burkleo | ........................ 375/311 |
| RE33,205 E | * | 4/1990 | Blake | ................... 250/214 AL |
| 5,113,068 A | * | 5/1992 | Burke, Jr. | ................ 250/214 B |
| 5,539,396 A | * | 7/1996 | Mori et al. | ............. 340/870.01 |
| 5,565,852 A | * | 10/1996 | Peltier et al. | ................ 340/632 |
| 5,907,491 A | * | 5/1999 | Canada et al. | .............. 700/108 |
| 6,028,522 A | * | 2/2000 | Petite | .......................... 340/641 |
| 6,121,875 A | * | 9/2000 | Hamm et al. | ................ 340/540 |
| 6,208,247 B1 | * | 3/2001 | Agre et al. | ............. 340/539.19 |
| 6,218,953 B1 | * | 4/2001 | Petite | .......................... 340/641 |
| 6,725,179 B1 | * | 4/2004 | Nagase | ........................ 702/188 |
| 6,799,031 B1 | * | 9/2004 | Lewiner et al. | ........... 455/404.1 |
| 6,941,204 B2 | * | 9/2005 | Halm et al. | .................... 701/33 |
| 7,050,894 B2 | * | 5/2006 | Halm et al. | .................... 701/33 |
| 7,102,505 B2 | * | 9/2006 | Kates | ......................... 340/521 |
| 7,130,757 B2 | * | 10/2006 | Corwin et al. | .............. 702/127 |
| 7,230,528 B2 | * | 6/2007 | Kates | ......................... 340/521 |
| 2002/0013679 A1 | * | 1/2002 | Petite | ......................... 702/188 |
| 2002/0120422 A1 | * | 8/2002 | Nagase | ........................ 702/127 |
| 2004/0162651 A1 | * | 8/2004 | Halm et al. | .................... 701/29 |
| 2005/0275530 A1 | * | 12/2005 | Kates | .................... 340/539.22 |
| 2006/0077063 A1 | * | 4/2006 | Cheng et al. | ............. 340/573.1 |
| 2006/0220834 A1 | * | 10/2006 | Maeng | ..................... 340/539.1 |
| 2006/0238358 A1 | * | 10/2006 | Al-Ali et al. | ............. 340/573.1 |

(Continued)

FOREIGN PATENT DOCUMENTS

GB     2 378 300 A     *     2/2003

(Continued)

*Primary Examiner*—Edward R Cosimano
(74) *Attorney, Agent, or Firm*—Jeffrey Moy; Weiss & Moy, P.C.

(57) ABSTRACT

A wireless metering device for real time measuring of at least one parameter has a probe for measuring the at least one parameter. The probe will wirelessly transmit real time measured values. A meter is wirelessly coupled to the probe. The meter is used for displaying the real time measured values.

19 Claims, 2 Drawing Sheets

U.S. PATENT DOCUMENTS

| | | | |
|---|---|---|---|
| 2006/0273896 A1* | 12/2006 | Kates | 340/539.18 |
| 2007/0063833 A1* | 3/2007 | Kates | 340/521 |
| 2007/0093982 A1* | 4/2007 | Corwin et al. | 702/127 |
| 2007/0139183 A1* | 6/2007 | Kates | 340/521 |
| 2007/0171059 A1* | 7/2007 | Pistilli | 340/568.1 |
| 2007/0179754 A1* | 8/2007 | Sper | 702/189 |

FOREIGN PATENT DOCUMENTS

| | | | |
|---|---|---|---|
| GB | 2 392 326 A | * | 2/2004 |
| JP | 2000-194980 A | * | 7/2000 |
| JP | 2001-160190 A | * | 6/2001 |
| JP | 2003-50620 A | * | 2/2003 |

* cited by examiner

WIRELESS METER FOR REAL TIME MEASUREMENTS AND METHOD THEREFOR

FIELD OF THE INVENTION

This invention relates generally to a meter device, and, more specifically, to a wireless meter device for real time measuring of one or more parameters such as the air temperature, air speed, relative humidity, light intensity, sound level, and the like.

BACKGROUND OF THE INVENTION

Meters are measuring devices that measure various parameters such as the air temperature, air speed, relative humidity, light intensity, sound level, and the like. These meters will have a probe which is used to measure one or more parameters. In some meters, the probe may be extended away from the main body of the meter. However, the probe is still coupled to the meter via a cable. The use of the cable restricts the accuracy of the measured parameter. For example, if one is trying to measure the temperature inside a refrigerator, the cable will prevent the door of the refrigerator from properly closing. Thus, the accuracy of the reading is compromised. Furthermore, the cable limits how far the probe may be placed away from the meter.

Presently there are wireless monitors can measure the air temperature and humidity. Monitors differ from meters in that monitors are stationary and not portable. Monitors use inexpensive slow response sensors which are adequate to measure gradual changes in stationary ambient temperature and relative humidity but are too slow for portable meters. Monitors also only send out periodic signals. Meters on the other hand send out continuous signals. Thus, one is not able to get real time measurements using a wireless monitor. The readings on the monitor only get updated at certain fixed intervals.

Therefore, a need existed to provide a metering device that overcomes the above problems. The metering device must also allow for the wireless real time reading of one or more parameters.

SUMMARY OF THE INVENTION

In accordance with one embodiment of the present invention, it is an object of the present invention to provide an improved metering device that overcomes the problems of the prior art.

It is another object of the present invention to provide an improved metering device that allows for the wireless real time reading of one or more parameters.

BRIEF DESCRIPTION OF THE EMBODIMENTS

In accordance with one embodiment of the present invention, a wireless metering device for real time measuring of at least one parameter is disclosed. The wireless metering device has a probe for measuring at least one parameter. The probe will wirelessly transmit real time measured values. A meter is wirelessly coupled to the probe. The meter is used for displaying the real time measured values.

In accordance with another embodiment of the present invention, a wireless metering device for real time measuring of a plurality of parameters is disclosed. The wireless metering device has a probe for measuring the plurality of parameters and for wirelessly transmitting real time measured values. The probe has a probe housing. A plurality of sensors is coupled to the housing. Each sensor is used to measure one of the plurality of parameters. A measuring circuit is located in the probe housing and coupled to the plurality of sensors for taking measurement signals from the plurality of sensors and converting the measurement signals to digital signals. A meter is wirelessly coupled to the probe for displaying the real time measured values. The meter has a meter housing. A measuring circuit is located in the meter housing. A display is coupled to the measuring circuit for showing the real time measured values.

The foregoing and other objects, features, and advantages of the invention will be apparent from the following, more particular, descriptions of the preferred embodiments of the invention, as illustrated in the accompanying drawing.

BRIEF DESCRIPTION OF THE DRAWINGS

Common reference numerals are used throughout the drawings and detailed description to indicate like elements.

DETAILED DESCRIPTION

Figure 1:
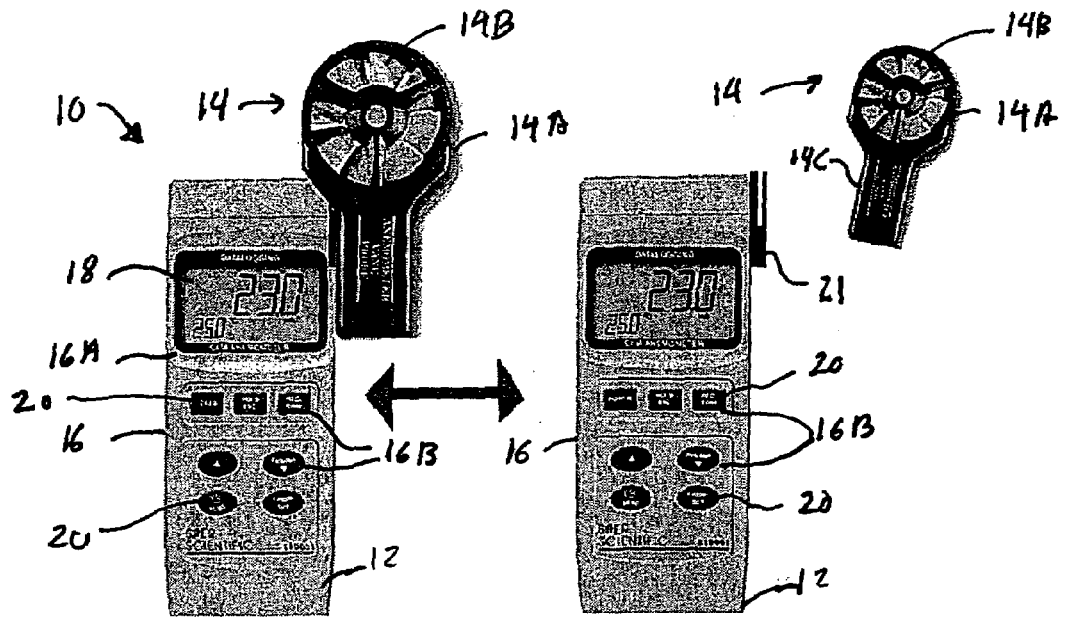
FIG. 1 is a front view of one embodiment of the metering device of the present invention.
Figure 2:
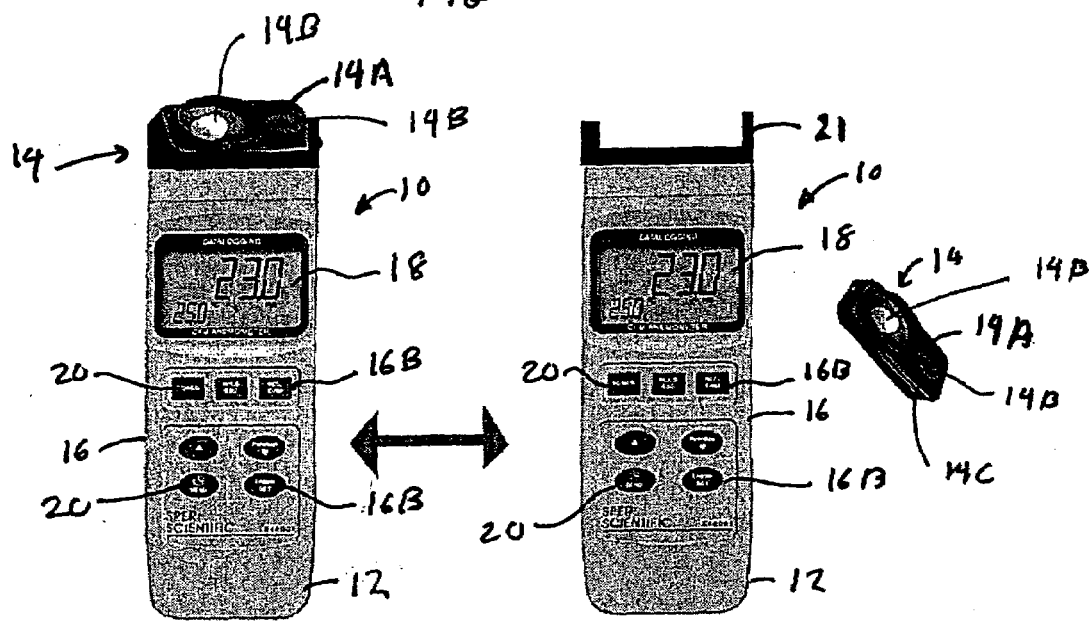
FIG. 2 is a front view of another embodiment of the metering device of the present invention.

Referring to FIGS. 1 and 2, a wireless metering device 10 is shown. The metering device 10 is comprised of two main components: the meter 12 and the probe 14. The meter 12 is generally used to display and store the readings from the probe 14. The probe 14 is used to measure the desired parameter(s). As seen in FIG. 1, the probe 14 may be directly coupled to the meter 12. Alternatively, the probe 14 may be detached from the meter 12 and transmit the readings wirelessly. In wireless operation, the meter 12 may be used to measure and record readings from one probe 14 and/or multiple probes 14.

The meter 12 has a main body section 16. The main body section 16 has a hollow interior which is used to house and protect the display circuitry 40 (FIG. 3) of the meter 12. The main body section 16 may be made of a single unit construction. Alternatively, in accordance with another embodiment of the present invention, the main body section 16 is comprised of a top section and a bottom section. In the embodiment depicted in FIGS. 1 and 2, the main body section 16 is rectangular in shape. However, this is given as an example and should not be seen as to limit the scope of the invention. The main body section 16 may come in other shapes without departing from the spirit and scope of the present invention.

The main body section 16 is made out of a lightweight but sturdy material. The material should be light enough to allow one to comfortably carry the metering device 10. The material should also be sturdy enough to prevent the main body section 16 from breaking and cracking when dropped from a short distance. In general, the main body section 16 may be made out of a material such as plastic, a lightweight aluminum, or the like. The listing of the above is given as an example and should not be seen as to limit the scope of the present invention.

The front surface of the main body section 16 will have a first opening 16A which is formed therein. The first opening 16A is used as a window to allow one to view a display 18. A plurality of second openings 16B is also formed in the front surface of the main body section 16. The second openings 16B are formed to position a plurality of control buttons 20 on the front surface of the main body section 16.

Coupled to the main body section 16 of the meter 12 is a probe 14. The probe 14 is used to measure one or more parameters such as air temperature, air speed, relative humidity, light intensity, sound level, and the like. The listing is only given as an example and should not be seen to limit the scope of the present invention. A connector 21 is used to couple the probe to the main body section 16. As shown in FIG. 1, the connector 21 is coupled to a top side area of the main body section 16. However, this is only shown an example and should not be seen as to limit the scope of the present invention. As may be seen in FIG. 2, the connector 21 is placed on a top surface of the main body section 16. The connector 21 is designed to accept different probes 14 that the meter 12 may use.

The probe 14 is used to measure one or more parameters. The probe 14 may be: 1) a vane anemometer/thermometer probe; 2) a vane anemometer/thermometer/hygrometer probe; 3) a hot wire anemometer/thermometer probe; 4) a thermometer/hygrometer probe; 5) a sound probe; or 6) a light probe. The listing of the above is given as an example and should not be seen as to limit the scope of the present invention. The examples are given to show that the probe 14 may be a single or multi-function probe 14. Furthermore, as stated above, in wireless operation, the meter 12 may be used to measure and record readings from one probe 14 and/or multiple probes 14.

The probe 14 will generally have a housing 14A. The housing 14A is made out of a lightweight but sturdy material. The material should be sturdy enough to prevent the probe 14 from breaking and cracking when dropped from a short distance. In general, the housing 14A is made out of a material such as plastic, a lightweight aluminum, or the like. The listing of the above is given as an example and should not be seen as to limit the scope of the present invention.

The housing 14A is used to hold one or more sensors 14B. The sensors 14B will be coupled to the housing 14A. The sensors 14B are used to measure a particular parameter (i.e., air temperature, air speed, relative humidity, light intensity, sound level, and the like). Each sensor 14B will be coupled to a measuring circuit 22 which is placed in the interior of the housing 14A. The measuring circuit 22 is used to convert the signals measured by the sensors 14B to electrical signals and to transmit these electrical signals to the meter 12. The housing 14A will also have a connector 14C. The connector 14C is used to couple the probe 14 to the housing 14A.

Figure 3:
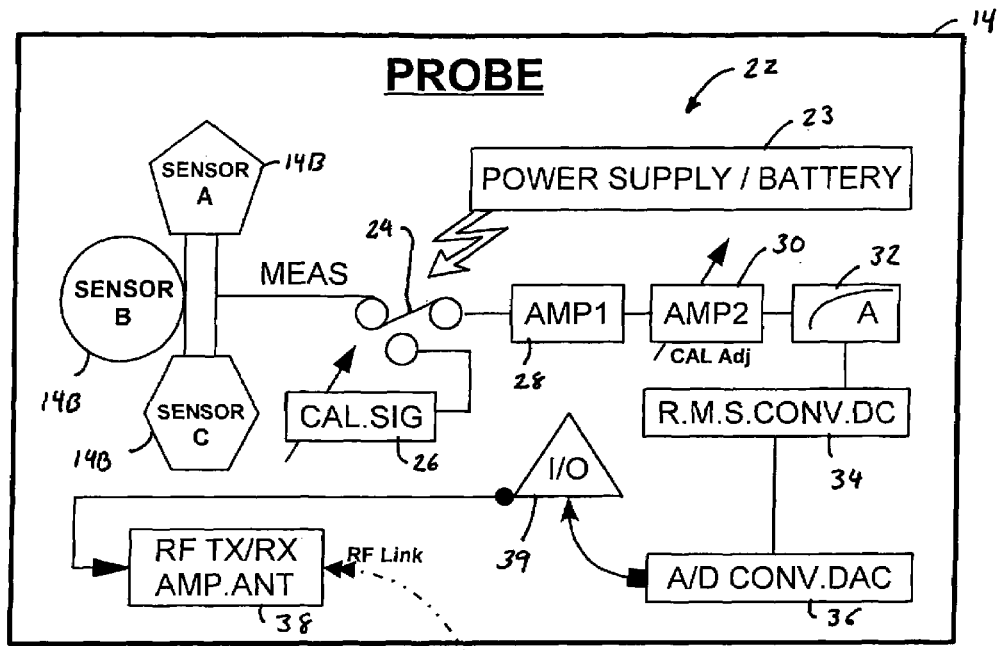
FIG. 3 is a simplified functional block diagram of the metering device of the present invention.
Figure 3:
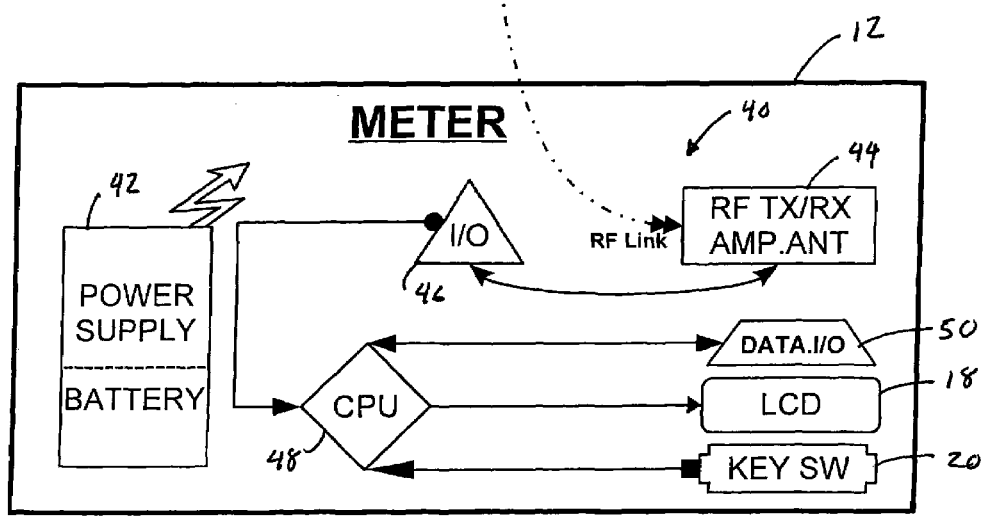

Referring now to FIG. 3, a simplified functional block diagram of the metering device 10 is shown. As stated above, the metering device 10 is comprised of two main components: the meter 12 and the probe 14. The probe 14 is powered by a power supply 23. The power supply 23 is generally a DC power supply such as a battery or the like. As stated above, the probe 14 will have one or more sensors 14B. Each sensor 14B will generally measure a desired parameter. Each sensor 14B will send measured signals to the measuring circuit 22. Each sensor 14B is coupled to a switch 24. The switch 24 couples each sensor 14B to the measuring circuit 22 or to a calibration circuit 26.

The calibration circuit 26 will allow a user to calibrate a desired sensor 14B. The calibration circuit 26 will send out a signal of a predefined level for electrical calibration of the metering device 10. Alternatively, a calibration signal can be coupled to the probe 14. In the calibration mode, the display 18 will generally show the level of the calibration signal. If the display 18 shows a value that differs from the calibration signal, one needs to adjust a calibration mechanism until the desired value appears on the display 18.

The measuring circuit 22 takes the signals from the sensor(s) 14B and converts the signals to digital signals. In the embodiment depicted in FIG. 3, the measuring circuit 22 has an amplifier 28. The amplifier 28 is used to increases the strength of the signals passing through it. A second amplifier 30 may be coupled to the output of the first amplifier 28. The second amplifier 30 is an adjustable amplifier. The adjustable amplifier 30 is used with the calibration circuit 26. If the display 18 shows a value that differs from the calibration signal, one needs to adjust the adjustable amplifier 30 (i.e., control buttons 20) until the desired value appears on the display 18. A filter 32 is coupled to the output of the second amplifier 30. The filter 32 is used to clear up the output signal from the second amplifier 30 by rejecting certain signals, vibrations, or radiations of certain frequencies while allowing others to pass. The output signal from the filter 32 then is sent to an RMS value detection circuit 34. Most parameters that need to be measured fluctuate in value. To measure the parameter(s) properly, the measuring circuit 22 needs to be able to measure these variations as accurately as possible. The RMS value detection circuit 34 allows for parameter measurements to be made at the site and then level range set in consideration of the full measurement time. The output signal from the RMS value detection circuit 34 is sent to an A/D converter 36. The A/D converter 36 will convert the analog signal from the RMS value detection circuit 34 to a digital output signal.

The digital signal from the A/D converter 36 is then sent to a transmitter 38. The transmitter 38 will wirelessly transmit the digital output signal from the A/D converter to the meter 12. The transmitter 38 may be a radio frequency (RF) transmitter, a Wi-Fi transmitter, a Bluetooth transmitter, or the like. The listing of the above is given as an example and should not be seen as to limit the scope of the present invention. Other types of wireless transmitters may be used without departing from the spirit and scope of the present invention.

An I/O port 39 may be coupled to the A/D converter 36 and the transmitter 38. The I/O port 39 is used to directly couple the probe 14 to the meter 12.

As shown in FIG. 3, the meter 12 is powered by a power supply 42. The power supply 42 is generally a DC power supply such as a battery or the like. The meter 12 will have a display circuit 40. The display circuit 40 will receive the wireless digital output signal from the probe 14 and convert the digital output signal to a measurement level which will be shown on the display 18. The display circuit 40 has a receiver 44. The receiver 44 will receive the digital output signal sent wirelessly by the transmitter 38. The receiver 44 may be a radio frequency (RF) receiver, a Wi-Fi receiver, a Bluetooth receiver, or the like. The listing of the above is given as an example and should not be seen as to limit the scope of the present invention. Other types of wireless receivers may be used without departing from the spirit and scope of the present invention.

An I/O port 46 may be coupled to the receiver 44. The I/O port 42 is used to directly couple the probe 14 to the meter 12.

The digital output signal received by the receiver 44 is sent to a processor 48. The processor 48 matches the digital signal output from the A/D converter 36 with a measurement level. The processor 48 may store the measurement level in an internal memory so that the meter 12 has datalogging capabilities. The processor 48 will send the measurement level to the display 18. The display 18 being used to show the different measurement signals. Any type of display 18 may be used. In general, an LCD panel or the like is used for the display 30.

The processor 48 may allow the metering device 10 to be auto-ranging. The processor 48 is programmed to automatically switch ranges if the level exceeds a certain scale. For example, if the metering device 10 is used to measure a sound level, the processor 48 may be programmed with a first scale range from 40-80 dB and a second scale range from 80-120 dB. Thus, if the sound level exceeds 80 dB, the processor 48 will automatically switch ranges. No switch is required to switch scale ranges.

The control buttons 20 are coupled to the processor 48. The control buttons 20 are used to control all operating functions of the metering device 10. By pressing different control button 20 one is able to activate/deactivate the metering device 10, select a desired sensor 14B, display the current value measured, display the highest recorded value for each sensor, etc. The listing of the above features is given as an example and should not be seen as to limit the scope of the present invention.

A data I/O port 50 may be coupled to the processor 48. The I/O port 50 will allow one to upload and download information to and from the meter 12. Thus, one can download recorded values from the metering device 10 to a computer or other recording device. One may also reprogram the processor 48 through the data I/O port 50.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure.

What is claimed is:

1. A wireless metering device for real time measuring of at least one parameter comprising:
    a portable probe for measuring the at least one parameter and for wirelessly transmitting real time measured values, wherein the at least one parameter is ambient light or sound; and
    a portable meter wirelessly coupled to the probe for displaying the real time measured value;
    wherein the wireless metering device is a portable self-contained metering device, the portable meter housed in a hand-held housing, the portable probe being detachable from the hand-held housing and communicates with the portable meter via a wireless RF signal.

2. A wireless metering device for real time measuring of at least one parameter in accordance with claim 1 wherein the meter stores the real time measured values.

3. A wireless metering device for real time measuring of at least one parameter in accordance with claim 1 wherein the at least one sensor comprise a plurality of sensors.

4. A wireless metering device for real time measuring of at least one parameter in accordance with claim 1 wherein the meter comprises:
    a meter housing;
    a meter measuring circuit located in the housing; and
    a display coupled to the meter measuring circuit.

5. A wireless metering device for real time measuring of at least one parameter in accordance with claim 4 wherein the meter measuring circuit comprises:
    a meter power supply;
    a receiver wirelessly coupled to the probe for receiving the real time measured values from the probe;
    a processor coupled to an output of the receiver; and
    a plurality of control buttons coupled to a first input of the processor.

6. A wireless metering device for real time measuring of at least one parameter in accordance with claim 5 wherein the meter measuring circuit comprises a meter I/O port coupled to a second input of the processor for directly coupling the probe to the meter.

7. A wireless metering device for real time measuring of at least one parameter in accordance with claim 6 wherein the meter measuring circuit comprises a data port coupled to the processor for downloading and uploading data to and from the meter.

8. A wireless metering device for real time measuring of at least one parameter in accordance with claim 1 wherein the probe comprises:
    at least one sensor for measuring the at least one parameter;
    a measuring circuit coupled to the at least one sensor for taking measurement signals from the at least one sensor and converting the measurement signals to digital signals; and
    a probe housing for protecting the measuring circuit.

9. A wireless metering device for real time measuring of at least one parameter in accordance with claim 8 wherein the measuring circuit comprises:
    a probe power supply;
    an amplifier coupled to an output of the at least one sensor;
    an RMS value detection circuit coupled to an output of the amplifier;
    an A/D converter coupled to an output of the RMS value detection circuit; and
    a wireless transmitter coupled to an output of the A/D converter.

10. A wireless metering device for real time measuring of at least one parameter in accordance with claim 9 wherein the measuring circuit further comprises a filter coupled to an output of the amplifier.

11. A wireless metering device for real time measuring of at least one parameter in accordance with claim 9 wherein the measuring circuit further comprises a probe I/O port coupled to an output of the A/D converter for directly coupling the probe to the meter.

12. A wireless metering device for real time measuring of at least one parameter in accordance with claim 9 further comprising:
    a calibrating circuit for sending a calibration signal to calibrate the at least one sensor; and
    a switching mechanism for coupling the sensor to the calibration circuit and the measuring circuit.

13. A wireless metering device for real time measuring of at least one parameter in accordance with claim 12 wherein the measuring circuit further comprises an adjustable amplifier coupled to the output of the amplifier for adjusting the calibration signal.

14. A wireless metering device for real time measuring of a plurality of parameters comprising:
    a portable probe for measuring the plurality of parameters and for wirelessly transmitting real time measured values, wherein the probe comprises:
        a probe housing;
        a plurality of sensors coupled to the housing, wherein each sensor measures one of the plurality of parameters; and
        a measuring circuit located in the probe housing and coupled to the plurality of sensors for taking measurement signals from the plurality of sensors and converting the measurement signals to digital signals; and a portable meter wirelessly coupled to the probe for displaying the real time measured values and for storing the real time measured values, wherein the meter comprises:
- a meter housing;
- a meter measuring circuit located in the housing, wherein the meter measuring circuit comprises:
  - a meter power supply;
  - a receiver wirelessly coupled to the probe for receiving the real time measured values from the probe;
  - a processor coupled to an output of the receiver; and
  - a plurality of control buttons coupled to a first input of the processor;
  - a meter I/O port coupled to a second input of the processor for directly coupling the probe to the meter; and
  - a display coupled to the meter measuring circuit;

wherein the wireless metering device is a portable self-contained metering device, the portable meter housed in a hand-held housing, the portable probe being detachable from the hand-held housing and communicates with the portable meter via a wireless RF signal.

15. A wireless metering device for real time measuring of at least one parameter in accordance with claim 14 wherein the measuring circuit comprises a data port for downloading and uploading data to and from the meter.

16. A wireless metering device for real time measuring of a plurality of parameters in accordance with claim 14 wherein the measuring circuit comprises:
- a probe power supply;
- an amplifier coupled to an output of the at least one sensor;
- an RMS value detection circuit coupled to an output of the amplifier;
- an A/D converter coupled to an output of the RMS value detection circuit; and
- a wireless transmitter coupled to an output of the A/D converter.

17. A wireless metering device for real time measuring a plurality of parameters in accordance with claim 16 wherein the measuring circuit further comprises a probe I/O port coupled to an output of the A/D converter for directly coupling the probe to the meter.

18. A wireless metering device for real time measuring of a plurality of parameters in accordance with claim 16 further comprising:
- a calibrating circuit for sending calibration signals to calibrate the plurality of sensors; and
- a switching mechanism for coupling the plurality of sensors to the calibration circuit and the measuring circuit.

19. A wireless metering device for real time measuring of at least one parameter comprising:
- a portable probe for measuring the at least one parameter and for wirelessly transmitting real time measured values; and
- a portable meter wirelessly coupled to the probe for displaying the real time measured value, wherein the meter comprises:
  - a meter housing;
  - a meter measuring circuit located in the housing, wherein the meter measuring circuit comprises:
    - a meter power supply;
    - a receiver wirelessly coupled to the probe for receiving the real time measured values from the probe;
    - a processor coupled to an output of the receiver;
    - a meter I/O port coupled to a second input of the processor for directly coupling the probe to the meter; and
    - a plurality of control buttons coupled to a first input of the processor; and
  - a display coupled to the meter measuring circuit;

wherein the wireless metering device is a portable self-contained metering device, the portable meter housed in a hand-held housing, the portable probe being detachable from the hand-held housing and communicates with the portable meter via a wireless RF signal.

* * * * *